United States Patent
Morikawa et al.

(10) Patent No.: US 9,931,614 B2
(45) Date of Patent: Apr. 3, 2018

(54) CERIA-ZIRCONIA-BASED COMPOSITE OXIDE AND METHOD FOR PRODUCING SAME, AND CATALYST FOR EXHAUST GAS PURIFICATION INCLUDING CERIA-ZIRCONIA-BASED COMPOSITE OXIDE

(71) Applicants: TOYOTA JIDOSHA KABUSHIKI KAISHA, Toyota-shi, Aichi-ken (JP); CATALER CORPORATION, Kakegawa-shi, Shizuoka-ken (JP)

(72) Inventors: Akira Morikawa, Nagakute (JP); Kae Konishi, Nagakute (JP); Toshitaka Tanabe, Nagakute (JP); Akihiko Suda, Nagakute (JP); Masahide Miura, Toyota (JP); Hiromasa Suzuki, Toyota (JP); Isao Chinzei, Toyota (JP); Akiya Chiba, Shizuoka (JP); Kosuke Iizuka, Kakegawa (JP)

(73) Assignees: TOYOTA JIDOSHA KABUSHIKI KAISHA, Toyota-shi, Aichi-ken (JP); CATALER CORPORATION, Kakegawa-shi, Shizuoka-ken (JP)

( * ) Notice: Subject to any disclaimer, the term of this patent is extended or adjusted under 35 U.S.C. 154(b) by 0 days.

(21) Appl. No.: 14/897,940

(22) PCT Filed: Jun. 12, 2014

(86) PCT No.: PCT/IB2014/001038
§ 371 (c)(1),
(2) Date: Dec. 11, 2015

(87) PCT Pub. No.: WO2014/199219
PCT Pub. Date: Dec. 18, 2014

(65) Prior Publication Data
US 2016/0121302 A1 May 5, 2016

(30) Foreign Application Priority Data
Jun. 13, 2013 (JP) .................... 2013-124311

(51) Int. Cl.
*B01J 23/10* (2006.01)
*B01J 37/16* (2006.01)
*C01G 25/00* (2006.01)
*B01J 37/00* (2006.01)
*B01J 37/12* (2006.01)

(52) U.S. Cl.
CPC .......... *B01J 23/10* (2013.01); *B01J 37/0009* (2013.01); *B01J 37/12* (2013.01); *B01J 37/16* (2013.01); *C01G 25/00* (2013.01); *C01P 2002/50* (2013.01); *C01P 2002/74* (2013.01); *C01P 2004/61* (2013.01); *C01P 2006/12* (2013.01)

(58) Field of Classification Search
CPC ........ B01J 23/10; B01J 37/16; B01J 37/0009; B01J 37/12; C01G 25/00; C01P 2002/50; C01P 2002/74; C01P 2004/61; C01P 2006/12
See application file for complete search history.

(56) References Cited

U.S. PATENT DOCUMENTS

| | | |
|---|---|---|
| 5,571,492 A | 11/1996 | Yao et al. |
| 5,580,536 A | 12/1996 | Yao et al. |
| 5,582,785 A | 12/1996 | Yao et al. |
| 6,576,207 B1 | 6/2003 | Mussmann et al. |
| 6,605,565 B1 | 8/2003 | Zhang et al. |
| 2002/0032123 A1 | 3/2002 | Shigapov et al. |
| 2003/0050189 A1 | 3/2003 | Morikawa et al. |
| 2004/0126298 A1 | 7/2004 | Stark et al. |
| 2007/0155624 A1 | 7/2007 | Wakita et al. |
| 2009/0124491 A1 | 5/2009 | Miura et al. |
| 2011/0099987 A1 | 5/2011 | Satou et al. |
| 2013/0029840 A1 | 1/2013 | Morikawa et al. |
| 2014/0038818 A1 | 2/2014 | Nakahara et al. |

FOREIGN PATENT DOCUMENTS

| | | |
|---|---|---|
| CN | 1133821 A | 10/1996 |
| CN | 101146612 A | 3/2008 |
| CN | 103038175 A | 4/2013 |
| EP | 0 708 066 A1 | 4/1996 |
| EP | 1 287 876 A2 | 3/2003 |
| JP | 8-103650 A | 4/1996 |
| JP | H08-109020 A | 4/1996 |
| JP | H08-109021 A | 4/1996 |
| JP | 11-021171 A | 1/1999 |
| JP | 2000-072447 A | 3/2000 |
| JP | 2001-232192 A | 8/2001 |
| JP | 2003-277059 A | 10/2003 |
| JP | 2005-231951 A | 9/2005 |
| JP | 2006-326550 A | 12/2006 |
| JP | 2009-084061 A | 4/2009 |

(Continued)

OTHER PUBLICATIONS

U.S. Office Action dated May 20, 2015, in U.S. Appl. No. 13/640,237, 10 pages.

(Continued)

*Primary Examiner* — Anthony J Zimmer
(74) *Attorney, Agent, or Firm* — Sughrue Mion, PLLC

(57) ABSTRACT

A ceria-zirconia-based composite oxide including a composite oxide containing ceria and zirconia, wherein the ceria-zirconia-based composite oxide contains at least one member selected from the group consisting of praseodymium, lanthanum, and yttrium in an amount of 0.5 to 5.0 mol % relative to a total amount of the cations contained in the ceria-zirconia-based composite oxide, where the ratio of the content of both cerium and the at least one member selected from the group consisting of praseodymium, lanthanum, and yttrium in the ceria-zirconia-based composite oxide to the content of zirconium therein ([cerium and the at least one member selected from the group consisting of praseodymium, lanthanum, and yttrium]:[zirconium]) is in the range of 43:57 to 48:52 by mole ratio.

5 Claims, 1 Drawing Sheet

(56) References Cited

FOREIGN PATENT DOCUMENTS

| JP | 2010-005587 A | 1/2010 | |
|---|---|---|---|
| JP | 2011-219329 A | 11/2011 | |
| JP | 2012-228628 A | 11/2012 | |
| JP | 2013-193042 A | 9/2013 | |
| WO | 2006/030763 A1 | 3/2006 | |
| WO | 2011/129460 A1 | 10/2011 | |
| WO | WO 2011129460 A1 * | 10/2011 | ............. B01J 35/04 |
| WO | 2013/140216 A1 | 9/2013 | |

OTHER PUBLICATIONS

Study on Oxygen Storage/Release Performance and Crystal Stricture of Ceria-Zirconia Compounds with Different Ce/Zr Rations, Thesis, Chapter 7, entitled Crystal Phases of Ceria-Zirconia Base Compounds Having Different Ce/Zr Rations, pp. 150-169, 2004.

Material Design and Crystal Structure Analysis Based on Ordered Arrangement of Ceria-Zirconia Solid Solution, Proceedings of 2006 Spring Meeting of the Japan Institute of Metals, p. 140, 2006, 4 pages total.

Masahiro Sugiura, Oxygen storage materials for automotive catalysts: ceria-zirconia solid solutions, Catalysis Surveys from Asia, vol. 7, No. 1, pp. 77-87, Apr. 1, 2003.

Masui et al., Reduction Behavior of $CeO_2$-$ZrO_2$ Solid Solution Prepared from Cerium Zirconyl Oxalate, Chem. Mater., vol. 10, No. 12, pp. 4005-4009, 1998.

Kishimoto et al, Crystal Structure of metastable k-CeZrO4 phase possessing an ordered arrangement of Ce and Zr ions, Journal of Alloys and Compounds, vol. 312, pp. 94-103, 2000.

Suda et al., Improvement of Oxygen Storage Capacity of $CeO_2$-$ZrO_2$ Solid Solution by Heat Treatment in Reducing Atmosphere, Journal of the Ceramic Society of Japan, vol. 110, No. 2, pp. 126-130, 2002.

Sasaki et al., Flaming Oxidation of Reduced $CeO_2$-$ZrO_2$ Solid Solution in the Near-Room-Temperature Range, Journal of the Ceramic Society of Japan vol. 110, No. 10, pp. 899-903, 2002.

Sasaki et al., Oxygen Absorption Behavior of $Ce_2Zr_2O_{7+x}$ and Formation of $Ce_2Zr_2O_{7.5}$, Journal of the Ceramic Society of Japan, vol. 6, pp. 382-385, 2003.

* cited by examiner

| | PROPORTION OF CATIONS IN COMPOSITE OXIDE [MOLAR RATIO] | | | | | | I(14/29) VALUE | I(28/29) VALUE | OXYGEN ABSORPTION/RELEASE AMOUNT (OSC)@400°C ($O_2$-mol/Ce-mol) |
|---|---|---|---|---|---|---|---|---|---|
| | Ce | Zr | Pr | La | Y | Fe | | | |
| EXAMPLE 1 | 45 | 54 | 1 | — | — | — | 0.033 | 0.008 | 0.215 |
| EXAMPLE 2 | 43.5 | 54 | 2.5 | — | — | — | 0.037 | 0.007 | 0.230 |
| EXAMPLE 3 | 40.5 | 57 | 2.5 | — | — | — | 0.031 | 0.006 | 0.205 |
| EXAMPLE 4 | 45.5 | 52 | 2.5 | — | — | — | 0.032 | 0.008 | 0.217 |
| EXAMPLE 5 | 43.5 | 54 | — | 2.5 | — | — | 0.033 | 0.007 | 0.220 |
| EXAMPLE 6 | 43.5 | 54 | — | — | 2.5 | — | 0.032 | 0.008 | 0.224 |
| EXAMPLE 7 | 41 | 54 | 5 | — | — | — | 0.032 | 0.008 | 0.215 |
| COMPARATIVE EXAMPLE 1 | 43.5 | 54 | — | — | — | 2.5 | 0.025 | 0.038 | 0.188 |
| COMPARATIVE EXAMPLE 2 | 39.5 | 58 | 2.5 | — | — | — | 0.029 | 0.005 | 0.195 |
| COMPARATIVE EXAMPLE 3 | 46.5 | 51 | 2.5 | — | — | — | 0.030 | 0.010 | 0.192 |
| COMPARATIVE EXAMPLE 4 | 46 | 54 | — | — | — | — | 0.030 | 0.008 | 0.197 |
| COMPARATIVE EXAMPLE 5 | 36 | 54 | 10 | — | — | — | 0.028 | 0.009 | 0.178 |

US 9,931,614 B2

CERIA-ZIRCONIA-BASED COMPOSITE OXIDE AND METHOD FOR PRODUCING SAME, AND CATALYST FOR EXHAUST GAS PURIFICATION INCLUDING CERIA-ZIRCONIA-BASED COMPOSITE OXIDE

BACKGROUND OF THE INVENTION

1. Field of the Invention

The invention relates to a ceria-zirconia-based composite oxide, a method for producing the composite oxide, and a catalyst for exhaust gas purification including the ceria-zirconia-based composite oxide.

2. Description of Related Art

Composite oxides containing various metal oxides have been utilized as supports, promoters, etc. for catalysts for exhaust gas purification. As a metal oxide contained in such composite oxide, ceria has been used because ceria can absorb and release oxygen in accordance with the partial pressure of oxygen in the atmosphere (has oxygen storage ability). In recent years, various kinds of composite oxides containing ceria are being investigated, and various ceria-zirconia-based composite oxides and methods for producing these have been disclosed.

For example, Japanese Patent Application Publication No. 2011-219329 (JP 2011-219329 A) discloses a ceria-zirconia-based composite oxide including a composite oxide including ceria and zirconia and a method for producing the composite oxide, the composite oxide being one in which the content ratio of cerium and zirconium ([cerium]:[zirconium]) is in the range of 43:57 to 48:52 by mole ratio and which, when heated for 5 hours in the atmosphere under the temperature condition of 1,100° C. and thereafter examined by X-ray diffractometry using CuKα, gives an X-ray diffraction (XRD) pattern wherein the intensity ratio of the diffraction line, at a 2θ of 14.5° to the diffraction line at a 2θ of 29° {I(14/29) value} and the intensity ratio of the diffraction line at a 2θ of 28.5° to the diffraction line at a 2θ of 29° {I(28/29) value} satisfy the requirements (I(14/29) value)≥0.015 and (I(28/29) value)≤0.08. According to this patent document, it is possible to provide a ceria-zirconia-based composite oxide which has, high heat resistance and which even after long-term exposure to high temperatures, can exhibit excellent oxygen storage capacity (OSC). Recently, however, the properties required of catalysts for exhaust gas purification are becoming higher and higher, and a ceria-zirconia-based composite oxide in which the oxygen storage material can be sufficiently inhibited from deteriorating thermally and which can sufficiently exhibit the oxygen absorption/release function from a low temperature has come to be desired.

Meanwhile, International Patent Application No. 2006/030763 (WO 2006/030763) discloses a cerium-zirconium-based composite oxide which is a composite oxide containing cerium and zirconium and which has (1) an oxygen release initiation temperature of 380° C. or lower, (2) an oxygen release amount of 485 μmil/g or larger, and (3) an oxygen release amount at 400° C. of 15 μmol/g or larger, and further discloses a method for producing a cerium-zirconium-based composite oxide which includes mixing a cerium source with a zirconium source in a given proportion, melting the resultant starting-material mixture at a temperature not lower than the melting point, then cooling the melt to form an ingot, subsequently pulverizing the ingot according to need to obtain a powder, successively removing distortions within the powder crystals by heating, and further finely pulverizing the powder. However, the ceria-zirconia-based composite oxide disclosed in WO 2006/030763 is insufficient in the effect of inhibiting the deterioration of the oxygen storage material, does not always sufficiently exhibit the oxygen absorption/release function from a lower temperature, and has insufficient durability.

SUMMARY OF THE INVENTION

The invention has been achieved in view of the problems of the related art and provides: a ceria-zirconia-based composite oxide in which the oxygen storage material can be sufficiently inhibited from deteriorating thermally and which can sufficiently exhibit the oxygen absorption/release function from a temperature as low as about 400° C.; a method for producing the composite oxide; and a catalyst for exhaust gas purification which includes the ceria-zirconia-based composite oxide.

The inventors made intensive studies in order to accomplish the object. As a result, they have found that by adding a specific rare-earth element capable of accelerating the reduction of ceria to a ceria-zirconia-based composite oxide so as to satisfy specific requirements, a ceria-zirconia-based composite oxide is obtained in which the oxygen storage material can be sufficiently inhibited from deteriorating thermally and the oxygen absorption/release function can be sufficiently exhibited from a temperature as low as about 400° C. The invention has thus been completed.

Namely, the ceria-zirconia-based composite oxide according to one aspect of the invention is a ceria-zirconia-based composite oxide including a composite oxide containing ceria and zirconia, and contains at least one member selected from the group consisting of praseodymium (Pr), lanthanum (La), and yttrium (Y) in an amount of 0.5 to 5.0 mol % relative to a total amount of the cations contained in the ceria-zirconia-based composite oxide, where the ratio of the content of both cerium and the at least one member selected from the group consisting of praseodymium, lanthanum, and yttrium in the to the content of zirconium in the ceria-zirconia-based composite oxide therein ([cerium and the at least one member selected from the group consisting of praseodymium, lanthanum, and yttrium]:[zirconium]) is in the range of 43:57 to 48:52 by mole ratio, and when heated for 5 hours in the atmosphere under a temperature condition of 1,100° C. and thereafter examined by X-ray diffractometry using CuKα, the ceria-zirconia-based composite oxide exhibits an X-ray diffraction pattern in which the intensity ratio of the diffraction line at a 2θ of 14.5° to the diffraction line at a 2θ of 29° {I(14/29) value} and the intensity ratio of the diffraction line at a 2θ of 28.5° to the diffraction line at a 2θ of 29° {I(28/29) value} satisfy the requirement (I(14/29) value)≥[0.02(I(28/29) value)]≤0.08.

The method for producing a ceria-zirconia-based composite oxide according to one aspect of the invention is a method for producing a ceria-zirconia-based composite oxide containing a composite oxide containing ceria and zirconia, and includes: preparing a ceria-zirconia-based solid-solution powder which contains at least one member selected from the group consisting of praseodymium, lanthanum, and yttrium in an amount of 0.5 to 5.0 mol % relative to a total cation amount and in which the ratio of the content of both cerium and the at least one member selected from the group consisting of praseodymium, lanthanum, and yttrium to the content of zirconium ([cerium and the at least one member selected from the group consisting of praseodymium, lanthanum, and yttrium]:[zirconium]) is in a range of 43:57 to 48:52 by mole ratio; press-molding the ceria-zirconia-based solid-solution powder at a pressure of 400 to 3,500 kgf/cm², and then subjecting, after the press molding, ceria-zirconia-based solid-solution powder to a reduction treatment under temperature conditions of 1,450 to 2,000° C. to obtain the ceria-zirconia-based composite oxide.

Furthermore, the catalyst for exhaust gas purification of the invention may contain the ceria-zirconia-based composite oxide.

In the method for producing a ceria-zirconia-based composite oxide, the ceria-zirconia-based composite oxide may be subjected to an oxidation treatment after the reduction treatment.

Incidentally, the I(14/29) value and I(28/29) value in one aspect of the invention respectively are the intensity ratio of the diffraction line at a 2θ of 14.5° to the diffraction line at a 2θ of 29° {I(14/29) value} and the intensity ratio of the diffraction line at a 2θ of 28.5° to the diffraction line at a 2θ of 29° {I(28/29) value}, the intensity ratios being determined from an X-ray diffraction pattern obtained by heating the ceria-zirconia-based composite oxide, as a substance to be examined, for 5 hours in the atmosphere under the temperature condition of 1,100° C. and thereafter examining the heated composite oxide by X-ray diffractometry using CuKα. For the X-ray diffractometry, use is made of a method in which "RINT 2100" (product name), manufactured by Rigaku Electric Corp., is used as an analyzer and an examination is made using a CuKα line under the conditions of 40 KV, 30 mA, and 2θ=2°/min.

Here, the diffraction line at a 2θ of 14.5° is a diffraction line assigned to the (111) plane of an ordered phase (κ phase), and the diffraction line at a 2θ of 29° is a line in which a diffraction line assigned to the (222) plane of the ordered phase and a diffraction line assigned to the (111) plane of the cubic phase of a ceria-zirconia solid solution overlap with each other. Therefore, the intensity ratio between the two diffraction lines, i.e., the value of I(14/29), is calculated, and this value is defined as an index which shows the retention rate (existence rate) of the ordered phase. When the diffraction-line intensities are determined, an average diffraction-line intensity for the 2θ range of 10° to 12° is subtracted as a background value from the value of each diffraction-line intensity. Incidentally, complete ordered phases include a κ phase ($Ce_2Zr_2O_8$), in which the oxygen sites are completely occupied, and a pyrochlore phase ($Ce_2Zr_2O_7$), in which all the oxygen sites are vacant, and the I(14/29) value for the κ phase and the I(14/29) value for the pyrochlore phase which were calculated from the corresponding PDF cards (PDF-2: 01-070-4048 for the κ phase and PDF-2: 01-075-2694 for the pyrochlore phase) are 0.04 and 0.05, respectively. The crystalline phase having an ordered phase, that is, an ordered arrangement structure configured of cerium ions and zirconium ions, has the structure of an arrangement of crystals which, in an examination by the XRD analysis using CuKα, give an X-ray diffraction pattern which has peaks at angles 2θ of 14.5°, 28°, 37°, 44.5°, and 51° (ordered arrangement phase of the φ' phase (the same phase as κ phase) type: a superlattice structure occurring in the fluorite structure). The term "peak" used herein means a peak in which the height from the base line to the peak top is 30 cps or more.

Meanwhile, the diffraction line at a 2θ of 28.5° is a diffraction line assigned to the (111) plane of $CeO_2$ alone. The intensity ratio of the diffraction line at a 2θ of 28.5° and the diffraction line at a 2θ of 29°, i.e., the value of I(28/29), is calculated, and this value is defined as an index which shows the degree to which $CeO_2$ is present as a separate phase in the composite oxide.

Although the reasons why the object is accomplished by the ceria-zirconia-based composite oxide, which is one aspect of the invention, are not necessarily definite, the inventors presume as described below. Namely, the pyrochlore phase ($Ce_2Zr_2O_7$) of $CeO_2$—$ZrO_2$ in the ceria-zirconia-based composite oxide undergoes phase changes to and from the κ phase in accordance with the partial pressure of oxygen in the gas phase to exhibit an oxygen storage capacity (OSC). The OSC attributable to the pyrochlore phase is insufficient in low-temperature-side oxygen absorption/release amount because this OSC is due to oxygen movement inside the crystal lattice. The inventors presume that in the aspect of the invention, praseodymium, which is at least one member selected from the group consisting of praseodymium, lanthanum, and yttrium and which brings about a negative value of ΔG (Gibbs free energy) during the reduction $Pr_6O_{11} \rightarrow 3Pr_2O_3 + O_2$, is introduced to facilitate the reduction of $CeO_2$, which has a positive value of ΔG during the reduction $2CeO_2 \rightarrow Ce_2O_3 + 0.5O_2$, thereby enabling the pyrochlore type CZ to exhibit the OSC from a lower temperature. The inventors further presume that by introducing a rare-earth element which, in the state of having a valance of +3, is stable, such as lanthanum or yttrium, the oxygen deficiencies inside the crystals are stabilized due to the principle of charge compensation, thereby making it possible to not only enable the OSC to be exhibited at a low temperature but also improve the heat resistance of the pyrochlore phase.

According to one aspect of the invention, it becomes possible to provide: a ceria-zirconia-based composite oxide in which the oxygen storage material can be sufficiently inhibited from deteriorating thermally and which can sufficiently exhibit the oxygen absorption/release function from a temperature as low as about 400° C.; a method for producing the composite oxide; and a catalyst for exhaust gas purification which includes the ceria-zirconia-based composite oxide.

BRIEF DESCRIPTION OF THE DRAWING

Features, advantages, and technical and industrial significance of exemplary embodiments of the invention will be described below with reference to the accompanying drawing, in which like numerals denote like elements, and wherein:

FIG. 1 is a table which shows the proportion of cations in each of the composite oxides of Examples 1 to 7 and Comparative Examples 1 to 5 and the I(14/29) value, I(28/29) value, and oxygen absorption/release amount thereof.

DETAILED DESCRIPTION OF EMBODIMENTS

The invention will be described below in detail with respect to preferred embodiments thereof.

First, the ceria-zirconia-based composite oxide according to an example of the invention is explained. Namely, the ceria-zirconia-based composite oxide according to an example of the invention is a ceria-zirconia-based composite oxide including a composite oxide including ceria and zirconia, and contains at least one member selected from the group consisting of praseodymium, lanthanum, and yttrium in an amount of 0.5 to 5.0 mol % relative to the total amount of the cations contained in the ceria-zirconia-based composite oxide, where the ratio of the content of both cerium and the at least one member selected from the group consisting of praseodymium, lanthanum, and yttrium to the content of zirconium in the ceria-zirconia-based composite oxide therein ([cerium and the at least one member selected from the group consisting of praseodymium, lanthanum, and yttrium]:[zirconium]) is in the range of 43:57 to 48:52 by mole ratio and, when heated for 5 hours in the atmosphere under a temperature condition of 1,100° C. and thereafter examined by X-ray diffractometry using CuKα, the ceria-zirconia-based composite oxide exhibits an X-ray diffraction pattern in which the intensity ratio of the diffraction line at a 2θ of 14.5° to the diffraction line at a 2θ of 29° {I(14/29) value} and the intensity ratio of the diffraction line at a 2θ of 28.5° to the diffraction line at a 2θ of 29° {I(28/29) value} satisfy the requirement (I(14/29) value)≥[0.02(I(28/29) value)]≤0.08.

The ceria-zirconia-based composite oxide according to an example of the invention needs to contain at least one member selected from the group consisting of praseodymium, lanthanum, and yttrium in an amount of 0.5 to 5.0 mol % relative to the total amount of the cations contained in the ceria-zirconia-based composite oxide. More preferably, the content of the at least one member is 1.0 to 3.0 mol %. In a case where the content of the at least one member selected from the group consisting of praseodymium, lanthanum, and yttrium is less than the lower limit, the effect of enabling the pyrochlore type CZ to exhibit the OSC from a lower temperature by facilitating the reduction of $CeO_2$ cannot be sufficiently obtained. Meanwhile, in a case where the content thereof exceeds the upper limit, the effect of improving the stability of the composite oxide by inhibiting the ceria from undergoing phase separation is not obtained, resulting in insufficient oxygen storage capacity (OSC) after a high-temperature durability test.

In the ceria-zirconia-based composite oxide according to an example of the invention, the ratio of the content of both cerium and the at least one member selected from the group consisting of praseodymium, lanthanum, and yttrium to the content of zirconium ([cerium and the at least one member selected from the group consisting of praseodymium, lanthanum, and yttrium]:[zirconium]) needs to be in the range of 43:57 to 48:52 by mole ratio. More preferably, the content ratio is in the range of 44:56 to 48:52 by mole ratio. In a case where the proportion of the content of both cerium and the at least one member selected from the group consisting of praseodymium, lanthanum, and yttrium is less than the lower limit, the decrease in OSC due to the zirconium-rich composition is too large as compared with the effect of improving the stability of the composite oxide by inhibiting the ceria from undergoing phase separation, resulting in insufficient oxygen storage capacity (OSC) after a high-temperature durability test. Meanwhile, in a case where the proportion of the content of both cerium and the at least one member selected from the group consisting of praseodymium, lanthanum, and yttrium exceeds the upper limit, the effect of improving the stability of the composite oxide by inhibiting the ceria from undergoing phase separation is not obtained, resulting in insufficient oxygen storage capacity (OSC) after a high-temperature durability test.

Furthermore, in the ceria-zirconia-based composite oxide according to an example of the invention, the value of I(14/29) described above needs to be 0.02 or larger. The value thereof is more preferably 0.030 or larger, especially preferably 0.033 or larger. In a case where the I(14/29) value is less than the lower limit, the retention rate of the ordered phase is low, resulting in insufficient oxygen storage capacity (OSC) after a high-temperature durability test. There is no particular upper limit on the value of I(14/29). However, the value thereof is preferably 0.05 or less from the standpoint that the I(14/29) value of the pyrochlore phase calculated from the PDF card (01-075-2694) is an upper limit.

In the ceria-zirconia-based composite oxide according to an example of the invention, the value of I(28/29) described above needs to be 0.08 or less, and the value thereof is more preferably 0.06 or less, especially preferably 0.04 or less. In a case where the I(28/29) value exceeds the upper limit, undergoing phase separation of the ceria is not sufficiently inhibited, resulting in insufficient oxygen storage capacity (OSC) after a high-temperature durability test. There is no particular lower limit on the value of I(28/29) described above, and smaller values are preferred.

It is considered that in the ceria-zirconia-based composite oxide according to an example of the invention, a crystalline phase (an ordered phase or an ordered arrangement phase of the pyrochlore phase type) having an ordered arrangement structure being composed of cerium ions and zirconium ions has been configured. Due to the formation of such ordered phase, it is possible to sufficiently inhibit the oxygen storage material from thermally deteriorating and the composite oxide exhibits sufficiently high oxygen absorption/release capacity even after exposure to high temperatures. Furthermore, in the ceria-zirconia-based composite oxide of the example of the invention, the proportion of the ordered phase to all the crystalline phase(s), which is determined as a ratio between peak intensities of the X-ray diffraction pattern, is preferably 50 to 100%, more preferably 80 to 100%. In a case where the proportion of the ordered phase is less than the lower limit, the effect of inhibiting the deterioration of the oxygen storage material of the composite oxide is prone to decrease.

The ceria-zirconia-based composite oxide according to an example of the invention may further contain at least one element selected from the group consisting of rare-earth elements other than cerium, praseodymium, lanthanum, and yttrium and of alkaline-earth metals. The ceria-zirconia-based composite oxide according to the example of the invention into which such element(s) have been incorporated tends to bring about higher ability to purify exhaust gases when used as the support of a catalyst for exhaust gas purification. Examples of such rare-earth elements other than cerium, praseodymium, lanthanum, and yttrium include scandium (Sc), neodymium (Nd), samarium (Sm), gadolium (Gd), terbium (Tb), dysprosium (Dy), ytterbium (Yb), and lutetium (Lu). Of these, Nd and Sc are preferred, and Nd is more preferred, from the standpoint that when a noble metal is supported, the composite oxide tends to show enhanced interaction with the noble metal and have a higher affinity therefor. Examples of the alkaline-earth metal elements include magnesium (Mg), calcium (Ca), strontium (Sr), barium (Ba), and radium (Ra). Preferred of these are Mg, Ca, and Ba, from the standpoint that when a noble metal is supported, the composite oxide tends to show enhanced interaction with the noble metal and have a higher affinity therefor. Since such rare-earth elements other than cerium and alkaline-earth metal elements which have low electronegativity show high interaction with noble metals, those elements are tend to be capable of combining with noble metals through oxygen in an oxidizing atmosphere to inhibit the noble metals from vaporizing off or sintering and sufficiently inhibit the noble metals, serving as active sites for exhaust gas purification, from deteriorating.

In the case where the ceria-zirconia-based composite oxide further contains at least one element selected from the group consisting of rare-earth elements other than cerium, praseodymium, lanthanum, and yttrium and of alkaline-earth metals, the content of the element is preferably 1 to 20 mass %, more preferably 3 to 7 mass %, based on the ceria-zirconia-based composite oxide. In a case where the content of such element is less than the lower limit, there is a tendency that in cases when a noble metal is fixed to the obtained composite oxide, it is difficult to sufficiently improve the interaction with the noble metal. On the other hand, contents thereof exceeding the upper limit tend to result in a decrease in oxygen storage capacity (OSC).

The specific surface area of the ceria-zirconia-based composite oxide is not particularly limited. However, the specific surface area thereof is preferably 0.1 to 2 $m^2/g$, more preferably 0.2 to 1 $m^2/g$. In a case where the specific surface area thereof is less than the lower limit, this composite oxide tends to show reduced interaction with noble metals and have reduced oxygen storage capacity (OSC). Meanwhile, in a case where the specific surface area thereof exceeds the upper limit, this composite oxide tends to have a larger proportion of particles with a small particle diameter and to have reduced heat resistance. Incidentally, the specific surface area can be calculated as a Brunauer-Emmett-Teller (BET) specific surface area from an adsorption isotherm using the BET adsorption isotherm equation.

Next, the method according to an example of the invention for producing the ceria-zirconia-based composite oxide of the example of invention will be explained.

The method for producing a ceria-zirconia-based composite oxide according to an example of the invention is a method for producing a ceria-zirconia-based composite oxide including a composite oxide including ceria and zirconia, and includes the steps of: preparing a ceria-zirconia-based solid-solution powder which contains at least one member selected from the group consisting of praseodymium, lanthanum, and yttrium in an amount of 0.5 to 5.0 mol % relative to the total cation amount and in which the ratio of the content of both cerium and the at least one member selected from the group consisting of praseodymium, lanthanum, and yttrium to the content of zirconium ([cerium and the at least one member selected from the group consisting of praseodymium, lanthanum, and yttrium]:[zirconium]) is in the range of 43:57 to 48:52 by mole ratio; press-molding the ceria-zirconia-based solid-solution powder at a pressure of 400 to 3,500 $kgf/cm^2$; and then subjecting the ceria-zirconia-based solid-solution powder to a reduction treatment under the temperature conditions of 1,450 to 2,000° C. to obtain the ceria-zirconia-based composite oxide.

The powder of a solid solution including ceria and zirconia according to the example of the invention (ceria-zirconia-based solid-solution powder) needs to contain at least one member selected from the group consisting of praseodymium, lanthanum, and yttrium in an amount of 0.5 to 5.0 mol % relative to the total amount of the cations contained in the solid-solution powder. In a case where the content of the at least one member selected from the group consisting of praseodymium, lanthanum, and yttrium in the ceria-zirconia-based solid-solution powder to be used is less than the lower limit, the effect of enabling the pyrochlore type CZ by facilitating the reduction of $CeO_2$ to exhibit the OSC from a lower temperature cannot be sufficiently obtained. Meanwhile, in a case where the content thereof exceeds the upper limit, the effect of improving the stability of the composite oxide by inhibiting the ceria from undergoing phase separation is not obtained, resulting in insufficient oxygen storage capacity (OSC) after a high-temperature durability test.

In the ceria-zirconia-based solid-solution powder according to the example of the invention, the ratio of the content of both cerium and the at least one member selected from the group consisting of praseodymium, lanthanum, and yttrium to the content of zirconium ([cerium and the at least one member selected from the group consisting of praseodymium, lanthanum, and yttrium]:[zirconium]) needs to be in the range of 43:57 to 48:52 by mole ratio. In a case where the proportion of the content of both cerium and the at least one member selected from the group consisting of praseodymium, lanthanum, and yttrium in the CZ solid-solution powder to be used is less than the lower limit, the decrease in OSC due to the zirconium-rich composition is too large as compared with the effect of improving the stability of the composite oxide by inhibiting the ceria from undergoing phase separation, resulting in insufficient oxygen storage capacity (OSC) after a high-temperature durability test. Meanwhile, in a case where the proportion of the content of both cerium and the at least one member selected from the group consisting of praseodymium, lanthanum, and yttrium exceeds the upper limit, the effect of improving the stability of the composite oxide by inhibiting the ceria from undergoing phase separation is not obtained, resulting in insufficient oxygen storage capacity (OSC) after a high-temperature durability test.

As such ceria-zirconia-based solid-solution powder, it is preferred to use a solid solution in which the ceria and the zirconia have been mixed on an atomic level, from the standpoint of more sufficiently forming an ordered phase. Preferably, the ceria-zirconia-based solid-solution powder has an average primary-particle diameter of about 2 to 100 nm.

Methods for producing such ceria-zirconia-based solid-solution powder are not particularly limited, and examples thereof include a method in which the so-called coprecipitation method is used to produce the solid-solution powder so that the content ratio of cerium, zirconium, and the at least one member selected from the group consisting of praseodymium, lanthanum, and yttrium is within the range mentioned above. Examples of the coprecipitation method include a method in which an aqueous solution that contains a salt (e.g., nitrate) of cerium, a salt (e.g., nitrate) of zirconium, and at least one salt selected from the group consisting of salts (e.g., nitrate) of praseodymium, salts (e.g., nitrate) of lanthanum, and salts (e.g., nitrate) of yttrium is used to yield a coprecipitation product in the presence of ammonia, and the obtained coprecipitation product is taken out by filtration, washed, subsequently dried and burned, and then pulverized using a pulverizer such as a ball mill to obtain the ceria-zirconia-based solid-solution powder. Incidentally, the aqueous solution containing a salt (e.g., nitrate) of cerium, a salt (e.g., nitrate) of zirconium, and at least one salt selected from the group consisting of salts (e.g., nitrate) of praseodymium, salts (e.g., nitrate) of lanthanum, and salts (e.g., nitrate) of yttrium is prepared so that the content ratio of cerium, zirconium, and at least one member selected from the group consisting of praseodymium, lanthanum, and yttrium in the solid-solution powder to be obtained is within the given range. According to need, a salt of at least one element selected from the group consisting of rare-earth elements other than cerium, praseodymium, lanthanum, and yttrium and of alkaline-earth elements, a surfactant (e.g., nonionic surfactant), etc. may be added to the aqueous solution.

Next, each step is described. In the example of the invention, the ceria-zirconia-based solid-solution powder is first press-molded at a pressure of 400 to 3,500 $kgf/cm^2$ (more preferably 500 to 3,000 kgf/cm$^2$) (press molding step). In a case where the pressure in the press molding step is less than the lower limit, the packing density of the powder is not sufficiently improved and, hence, crystal growth during reduction treatment is not sufficiently accelerated, resulting in a ceria-zirconia-based composite oxide which after a high-temperature durability test, has insufficient OSC. Meanwhile, in a case where the pressure in the press molding step exceeds the upper limit, phase separation of the ceria is prone to proceed, resulting in a ceria-zirconia-based composite oxide which after a high-temperature durability test, has insufficient oxygen storage capacity (OSC). Incidentally, methods for the press molding are not particularly limited, and press-molding methods including isostatic pressing (CIP) can be adopted as appropriate.

In the example of the invention, the press-molded ceria-zirconia-based solid-solution powder is subjected to a reduction treatment under the temperature conditions of 1,450 to 2,000° C. (more preferably 1,600 to 1,900° C.) (reduction treatment step), thereby obtaining the ceria-zirconia-based composite oxide according to an example. In a case where the temperature conditions for the reduction treatment are below the lower limit, the stability of the ordered phase is low, resulting in a ceria-zirconia-based composite oxide which after a high-temperature durability test, has insufficient oxygen storage capacity (OSC). Meanwhile, temperature conditions for the reduction treatment exceeding the upper limit result in a poor balance between the energy necessary for the reduction treatment (e.g., electric power) and the improvement in performance.

Methods for the reduction treatment are not particularly limited so long as the solid-solution powder can be heat-treated in a reducing atmosphere under the given temperature conditions. Examples thereof include: (i) a method which includes placing the solid-solution powder in a vacuum heating furnace, evacuating the furnace, thereafter introducing a reducing gas into the furnace to change the atmosphere inside the furnace into a reducing atmosphere, and heating the powder under the given temperature conditions to conduct a reduction treatment; (ii) a method which includes using a furnace made of graphite, placing the solid-solution powder in the furnace, evacuating the furnace, and then heating the furnace under the given temperature conditions to cause the furnace body, a heated fuel, etc. to generate reducing gases such as carbon monoxide (CO) and hydrocarbon (HC) and thereby change the atmosphere inside the furnace into a reducing atmosphere to conduct a reduction treatment; and (iii) a method in which the solid-solution powder is placed in a crucible filled with activated carbon (C) and heated under the given temperature conditions to cause the activated C, etc. to generate reducing gases such as CO and HC and thereby change the atmosphere inside the crucible into a reducing atmosphere to conduct a reduction treatment.

Reducing gases to be used for achieving such reducing atmosphere are not particularly limited, and use can be made, as appropriate, of reducing gases such as CO, HC, H$_2$, and other HC gases. More preferred of such reducing gases is one containing no C, from the standpoint of preventing the reduction treatment from yielding by-products, such as zirconium carbide (ZrC), when conducted at higher temperatures. In the case where such reducing gas containing no C is used, the reduction treatment can be conducted at a higher temperature close to the melting point of, for example, zirconium, thereby making it possible to more sufficiently improve the structural stability of the crystalline phase.

The period of heating for such reduction treatment is not particularly limited. However, the heating period is preferably about 0.5 to 5 hours. In a case where the heating period is less than the lower limit, there is a tendency that the crystal grain diameter of the solid-solution powder is unable to be sufficiently increased. Meanwhile, in a case where the heating period exceeds the upper limit, there is a tendency that the grain growth proceeds sufficiently and subsequent operations become unnecessary, resulting in a decrease in profitability.

In the example of the invention, it is preferable that after the heat treatment step, the ceria-zirconia-based composite oxide be further subjected to an oxidation treatment (oxidation treatment step). The oxidation treatment compensates for the loss of oxygen which occurred during the reduction, and tends to result in improved stability of the obtained ceria-zirconia-based composite oxide as an oxide powder.

Methods for the oxidation treatment are not particularly limited. For example, a suitable method is to heat-treat the ceria-zirconia-based composite oxide in an oxidizing atmosphere (e.g., the air). Although heating-temperature conditions for such oxidation treatment are not particularly limited, temperatures of about 300 to 800° C. are preferred. The period of heating for the oxidation treatment is also not particularly limited. However, the heating period is preferably about 0.5 to 5 hours.

Although the ceria-zirconia-based composite oxide according to an example of the invention and the method of the invention for producing the composite oxide were explained above, the catalyst for exhaust gas purification according to an example of the invention, which includes the ceria-zirconia-based composite oxide, will be explained below.

The catalyst for exhaust gas purification according to an example of the invention includes the ceria-zirconia-based composite oxide of the example of the invention. In this catalyst for exhaust gas purification according to an example of the invention, the oxygen storage material can be sufficiently inhibited from deteriorating thermally and the oxygen absorption/release function can be sufficiently exhibited from a temperature as low as about 400° C. Consequently, high catalytic activity is exhibited.

Preferred examples of the catalyst for exhaust gas purification of an example the invention include a catalyst for exhaust gas purification which contains: a support including the ceria-zirconia-based composite oxide according to an example of the invention; and a noble metal supported on the support. Examples of the noble metal include platinum, rhodium, palladium, osmium, iridium, gold, and silver. Methods for fixing a noble metal to the support are not particularly limited, and conventional methods can be adopted as appropriate. For example, use may be made of a method which includes dissolving a salt (nitrate, chloride, acetate, etc.) of a noble metal or a complex of a noble metal in a solvent such as water or an alcohol, immersing a powder of the ceria-zirconia-based composite oxide (support) in the solution, removing the solvent therefrom, and then burning the powder. The amount of the noble metal to be fixed to the support is not particularly limited, and the noble metal may be fixed, as appropriate, in a necessary amount according to the objective design, etc. Preferably, the amount thereof is 0.01 mass % or larger.

Other preferred examples of the catalyst for exhaust gas purification according to an example of the invention include a catalyst for exhaust gas purification which contains: a first catalyst including catalyst support microparticles and a noble metal supported on the catalyst support microparticles; and the ceria-zirconia-based composite oxide according to an example of the invention disposed at the periphery of the first catalyst. The catalyst support microparticles are not particularly limited, and use can be made, as appropriate, of a support which includes a metal oxide or metal oxide composite and which is usable as the support of a catalyst for exhaust gas purification (for example, alumina particles, particles including alumina/ceria, or particles including alumina/ceria/zirconia). Although the average particle diameter of such catalyst support microparticles is not particularly limited, the average particle diameter thereof is preferably 5 to 100 nm. As a method for fixing a noble metal to such catalyst support microparticles, the above-mentioned method can be adopted. The amount of the noble metal to be fixed to the catalyst support microparticles is not particularly limited, and the noble metal may be fixed, as appropriate, in a necessary amount according to the objective design, etc. Preferably, the amount thereof is 0.01 mass % or larger. Furthermore, methods for disposing the ceria-zirconia-based composite oxide of the invention at the periphery of the first catalyst are not particularly limited, and use can be made of, for example, a method in which the first catalyst is mixed with the ceria-zirconia-based composite oxide of the invention. From the standpoint of obtaining higher catalytic activity, it is preferable that the ceria-zirconia-based composite oxide according to an example of the invention should have been disposed, in a highly dispersed state, at the periphery of the first catalyst.

The invention is explained below in more detail with reference to Examples and Comparative Examples, but the invention should not be construed as being limited to the following Examples.

Example 1

A ceria-zirconia-based solid-solution powder in which the content ratio of cerium, zirconium, and praseodymium ([cerium]:[zirconium]:[praseodymium]) was 45:54:1 by mole ratio was prepared in the following manner. First, to 1,217 g of an aqueous solution containing ammonia in an amount of 1.2 equivalents to the neutralization equivalent were added 442 g of an aqueous cerium nitrate solution having a concentration of 28 mass % in terms of $CeO_2$ content, 590 g of an aqueous zirconium oxynitrate solution having a concentration of 18 mass % in terms of $ZrO_2$ content, 100 g of an aqueous solution containing praseodymium nitrate in an amount of 1.2 g in terms of $Pr_6O_{11}$ amount, and 197 g of an aqueous solution containing hydrogen peroxide in an amount 1.1 times by mole ratio the amount of the cerium contained, thereby producing a coprecipitation product. The resultant coprecipitation product was taken out by centrifuging and washed (ion-exchanged water). Next, the obtained coprecipitation product was dried at 110° C. for 10 hours or longer and then burned in the atmosphere at 400° C. for 5 hours, thereby obtaining a solid solution of cerium, zirconium, and praseodymium ($CeO_2$—$ZrO_2$—$Pr_6O_{11}$ solid solution). Thereafter, the solid solution was pulverized using a pulverizer (product name, "Wonder Blender"; manufactured by AS ONE Corporation) so as to result in a particle diameter of 75 μm or smaller through sieving. Thus, a powder of the Ceria-zirconia-praseodymium solid solution was obtained.

Next, 20 g of the obtained Ceria-zirconia-praseodymium solid-solution powder was packed into a bag made of polyethylene (capacity, 0.05 L). The bag was degassed, and then the opening of the bag was sealed by heating. Subsequently, using a CIP device (product name, "CK4-22-60"; manufactured by NIKKISO CO., LTD.), CIP was given to the bag for 1 minute at a pressure (molding pressure) of 2,000 $kgf/cm^2$ to thereby compact the powder. Thus, a powder compact of the Ceria-zirconia-praseodymium solid solution was obtained. The powder compact had dimensions of 4 cm in length, 4 cm in width, and 7 mm in average thickness and a weight of about 20 g.

Powder compacts (two) thus obtained were placed in a crucible (capacity: diameter, 8 cm; height, 7 cm) filled with 70 g of activated C, and a lid was put thereon. The crucible was then introduced into a high-speed heating electric furnace. This crucible was heated to 1,000° C. over 1 hour, thereafter heated to 1,700° C. (reduction temperature) over 4 hours and held for 5 hours, subsequently cooled to 1,000° C. over 4 hours, and then allowed to naturally cool to room temperature, thereby obtaining a reduction product.

The obtained reduction product was heated and oxidized in the atmosphere for 5 hours under the temperature condition of 500° C. to obtain a ceria-zirconia-praseodymium composite oxide in which the content ratio of cerium, zirconium, and praseodymium ([cerium]:[zirconium]:[praseodymium]) was 45:54:1 by mole ratio. The obtained Ceria-zirconia-praseodymium composite oxide was pulverized so as to result in a size of 75 μm or less through sieving.

<Examination by X-ray diffraction pattern(XRD)> The obtained Ceria-zirconia-praseodymium composite oxide was heat-treated in the atmosphere at 1,100° C. for 5 hours (high-temperature durability test). The crystalline phase of the treated Ceria-zirconia-praseodymium composite oxide was examined by X-ray diffractometry. An X-ray diffraction pattern was determined using, as an X-ray diffractometer, "RINT-2100" (product name), manufactured by Rigaku Electric Corp. I(14/29) value and I(28/29) value were determined therefrom. The obtained results are shown in the table of FIG. 1.

<Test for determining oxygen absorption/release amount: OSC evaluation method> Three grams of the Ceria-zirconia-praseodymium composite oxide powder which had undergone the durability test was physically mixed in a mortar with 1 g of a Pd/$Al_2O_3$ catalyst including supported Pd (0.25 wt %) to obtain a catalyst sample for exhaust gas purification. A 15-mg portion of the obtained sample was weighed out and examined for oxygen absorption/release amount with a thermogravimeter. The term oxygen absorption/release amount means the amount of oxygen absorbed/released ($O_2$-mol/Ce-mol) at 400° C. per mole of the cerium contained in the catalyst, and this amount was obtained by: disposing the catalyst sample in the sample cell of the thermogravimeter (TG; product name, TGA-50; manufactured by Shimadzu Corporation); alternately passing at the temperature condition of 400° C. a gas composed of $H_2$ (10 vol %) and $N_2$ (90 vol %) and a gas constituted of air (21 vol % $O_2$ and 78 vol % $N_2$) for 10 minutes each at intervals of 20 minutes at a flow rate of 200 mL/min for the 15 mg of the catalyst; and determining the oxygen absorption/release amount from the reversible weight changes using the thermogravimeter. The value obtained on the oxygen release side (reduction side) was used for the evaluation. In this case, a theoretical limit of the oxygen release amount is 0.25. The obtained results are shown in the table of FIG. 1.

Example 2

A ceria-zirconia-based solid-solution powder in which the content ratio of cerium, zirconium, and praseodymium ([cerium]:[zirconium]:[praseodymium]) was 43.5:54:2.5 by mole ratio was obtained in the same manner as in Example 1, except that use was made of 428 g of an aqueous cerium nitrate solution having a concentration of 28 mass % in terms of $CeO_2$ content, 590 g of an aqueous zirconium oxynitrate solution having a concentration of 18 mass % in terms of $ZrO_2$ content, and 100 g of an aqueous solution containing praseodymium nitrate in an amount of 2.9 g in terms of $Pr_6O_{11}$ amount. Subsequently, a Ceria-zirconia-praseodymium composite oxide in which the content ratio of cerium, zirconium, and praseodymium ([cerium]:[zirconium]:[praseodymium]) was 43.5:54:2.5 by mole ratio was obtained in the same manner as in Example 1. The obtained Ceria-zirconia-praseodymium composite oxide was subjected to an examination by XRD and a test for determining oxygen absorption/release amount, in the same manners as in Example 1. The obtained results are shown in the table of FIG. 1.

Example 3

A ceria-zirconia-based solid-solution powder in which the content ratio of cerium, zirconium, and praseodymium ([cerium]:[zirconium]:[praseodymium]) was 40.5:57:2.5 by mole ratio was obtained in the same manner as in Example 1, except that use was made of 398 g of an aqueous cerium nitrate solution having a concentration of 28 mass % in terms of $CeO_2$ content, 623 g of an aqueous zirconium oxynitrate solution having a concentration of 18 mass % in terms of $ZrO_2$ content, and 100 g of an aqueous solution containing praseodymium nitrate in an amount of 3 g in terms of $Pr_6O_{11}$ amount. Subsequently, a Ceria-zirconia-praseodymium composite oxide in which the content ratio of cerium, zirconium, and praseodymium ([cerium]:[zirconium]:[praseodymium]) was 40.5:57:2.5 by mole ratio was obtained in the same manner as in Example 1. The obtained Ceria-zirconia-praseodymium composite oxide was subjected to an examination by XRD and a test for determining oxygen absorption/release amount, in the same manners as in Example 1. The obtained results are shown in the table of FIG. 1.

Example 4

A ceria-zirconia-based solid-solution powder in which the content ratio of cerium, zirconium, and praseodymium ([cerium]:[zirconium]:[praseodymium]) was 45.5:52:2.5 by mole ratio was obtained in the same manner as in Example 1, except that use was made of 447 g of an aqueous cerium nitrate solution having a concentration of 28 mass % in terms of $CeO_2$ content, 569 g of an aqueous zirconium oxynitrate solution having a concentration of 18 mass % in terms of $ZrO_2$ content, and 100 g of an aqueous solution containing praseodymium nitrate in an amount of 2.9 g in terms of $Pr_6O_{11}$ amount. Subsequently, a Ceria-zirconia-praseodymium composite oxide in which the content ratio of cerium, zirconium, and praseodymium ([cerium]:[zirconium]:[praseodymium]) was 45.5:52:2.5 by mole ratio was obtained in the same manner as in Example 1. The obtained Ceria-zirconia-praseodymium composite oxide was subjected to an examination by XRD and a test for determining oxygen absorption/release amount, in the same manners as in Example 1. The obtained results are shown in the table of FIG. 1.

Example 5

A ceria-zirconia-based solid-solution powder in which the content ratio of cerium, zirconium, and lanthanum ([cerium]:[zirconium]:[lanthanum]) was 43.5:54:2.5 by mole ratio was obtained in the same manner as in Example 1, except that use was made of 428 g of an aqueous cerium, nitrate solution having a concentration of 28 mass % in terms of $CeO_2$ content, 590 g of an aqueous zirconium oxynitrate solution having a concentration of 18 mass % in terms of $ZrO_2$ content, and 100 g of an aqueous solution containing lanthanum nitrate in an amount of 2.8 g in terms of $La_2O_3$ amount. Subsequently, a CZ-lanthanum composite oxide in which the content ratio of cerium, zirconium, and lanthanum ([cerium]:[zirconium]:[lanthanum]) was 43.5:54:2.5 by mole ratio was obtained in the same manner as in Example 1. The obtained CZ-lanthanum composite oxide was subjected to an examination by XRD and a test for determining oxygen absorption/release amount, in the same manners as in Example 1. The obtained results are shown in the table of FIG. 1.

Example 6

A ceria-zirconia-based solid-solution powder in which the content ratio of cerium, zirconium, and yttrium ([cerium]:[zirconium]:[yttrium]) was 43.5:54:2.5 by mole ratio was obtained in the same manner as in Example 1, except that use was made of 428 g of an aqueous cerium nitrate solution having a concentration of 28 mass % in terms of $CeO_2$ content, 590 g of an aqueous zirconium oxynitrate solution having a concentration of 18 mass % in terms of $ZrO_2$ content, and 100 g of an aqueous solution containing yttrium nitrate in an amount of 2 g in terms of $Y_2O_3$ amount. Subsequently, a CZ-yttrium composite oxide in which the content ratio of cerium, zirconium, and yttrium ([cerium]:[zirconium]:[yttrium]) was 43.5:54:2.5 by mole ratio was obtained in the same manner as in Example 1. The obtained CZ-yttrium composite oxide was subjected to an examination by XRD and a test for determining oxygen absorption/release amount, in the same manners as in Example 1. The obtained results are shown in the table of FIG. 1.

Example 7

A ceria-zirconia-based solid-solution powder in which the content ratio of cerium, zirconium, and praseodymium ([cerium]:[zirconium]:[praseodymium]) was 41:54:5 by mole ratio was obtained in the same manner as in Example 1, except that use was made of 428 g of an aqueous cerium nitrate solution having a concentration of 28 mass % in terms of $CeO_2$ content, 590 g of an aqueous zirconium oxynitrate solution having a concentration of 18 mass % in terms of $ZrO_2$ content, and 100 g of an aqueous solution containing praseodymium nitrate in an amount of 5.8 g in terms of $Pr_6O_{11}$ amount. Subsequently, Ceria-zirconia-praseodymium composite oxide in which the content ratio of cerium, zirconium, and praseodymium ([cerium]:[zirconium]:[praseodymium]) was 41:54:5 by mole ratio was obtained in the same manner as in Example 1. The obtained Ceria-zirconia-praseodymium composite oxide was subjected to an examination by XRD and a test for determining oxygen absorption/release amount, in the same manners as in Example 1. The obtained results are shown in the table of FIG. 1.

Comparative Example 1

A ceria-zirconia-based solid-solution powder in which the content ratio of cerium, zirconium, and iron ([cerium]:[zirconium]:[iron]) was 43.5:54:2.5 by mole ratio was obtained in the same manner as in Example 1, except that use was made of 428 g of an aqueous cerium nitrate solution having a concentration of 28 mass % in terms of $CeO_2$ content, 590 g of an aqueous zirconium oxynitrate solution having a concentration of 18 mass % in terms of $ZrO_2$ content, and 100 g of an aqueous solution containing iron nitrate in an amount of 0.5 g in terms of $Fe_2O_3$ amount. Subsequently, a CZ-iron composite oxide in which the content ratio of cerium, zirconium, and iron ([cerium]:[zirconium]:[iron]) was 43.5:54:2.5 by mole ratio was obtained in the same manner as in Example 1. The obtained CZ-iron composite oxide was subjected to an examination by XRD and a test for determining oxygen absorption/release amount, in the same manners as in Example 1. The obtained results are shown in the table of FIG. 1.

Comparative Example 2

A ceria-zirconia-based solid-solution powder in which the content ratio of cerium, zirconium, and praseodymium ([cerium]:[zirconium]:[praseodymium]) was 39.5:58:2.5 by mole ratio was obtained in the same manner as in Example 1, except that use was made of 428 g of an aqueous cerium nitrate solution having a concentration of 28 mass % in terms of $CeO_2$ content, 634 g of an aqueous zirconium oxynitrate solution having a concentration of 18 mass % in terms of $ZrO_2$ content, and 100 g of an aqueous solution containing praseodymium nitrate in an amount of 3 g in terms of $Pr_6O_{11}$ amount. Subsequently, a Ceria-zirconia-praseodymium composite oxide in which the content ratio of cerium, zirconium, and praseodymium ([cerium]:[zirconium]:[praseodymium]) was 39.5:58:2.5 by mole ratio was obtained in the same manner as in Example 1. The obtained Ceria-zirconia-praseodymium composite oxide was subjected to an examination by XRD and a test for determining oxygen absorption/release amount, in the same manners as in Example 1. The obtained results are shown in the table of FIG. 1

Comparative Example 3

A ceria-zirconia-based solid-solution powder in which the content ratio of cerium, zirconium, and praseodymium ([cerium]:[zirconium]:[praseodymium]) was 46.5:51:2.5 by mole ratio was obtained in the same manner as in Example 1, except that use was made of 457 g of an aqueous cerium nitrate solution having a concentration of 28 mass % in terms of $CeO_2$ content, 557.6 g of an aqueous zirconium oxynitrate solution having a concentration of 18 mass % in terms of $ZrO_2$ content, and 100 g of an aqueous solution containing praseodymium nitrate in an amount of 2.9 g in terms of $Pr_6O_{11}$ amount. Subsequently, a Ceria-zirconia-praseodymium composite oxide in which the content ratio of cerium, zirconium, and praseodymium ([cerium]:[zirconium]:[praseodymium]) was 46.5:51:2.5 by mole ratio was obtained in the same manner as in Example 1. The obtained Ceria-zirconia-praseodymium composite oxide was subjected to an examination by XRD and a test for determining oxygen absorption/release amount, in the same manners as in Example 1. The obtained results are shown in the table of FIG. 1

Comparative Example 4

A CZ solid-solution powder in which the content ratio of cerium and zirconium ([cerium]:[zirconium]) was 46:54 by mole ratio was obtained in the same manner as in Example 1, except that use was made of 452 g of an aqueous cerium nitrate solution having a concentration of 28 mass % in terms of $CeO_2$ content and 590 g of an aqueous zirconium oxynitrate solution having a concentration of 18 mass % in terms of $ZrO_2$ content. Subsequently, a CZ composite oxide in which the content ratio of cerium and zirconium ([cerium]:[zirconium]) was 46:54 by mole ratio was obtained in the same manner as in Example 1. The obtained CZ composite oxide was subjected to an examination by XRD and a test for determining oxygen absorption/release amount, in the same manners as in Example 1. The obtained results are shown in the table of FIG. 1.

Comparative Example 5

A ceria-zirconia-based solid-solution powder in which the content ratio of cerium, zirconium, and praseodymium ([cerium]:[zirconium]:[praseodymium]) was 36:54:10 by mole ratio was obtained in the same manner as in Example 1, except that use was made of 354 g of an aqueous cerium nitrate solution having a concentration of 28 mass % in terms of $CeO_2$ content, 590 g of an aqueous zirconium oxynitrate solution having a concentration of 18 mass % in terms of $ZrO_2$ content, and 100 g of an aqueous solution containing praseodymium nitrate in an amount of 11.7 g in terms of $Pr_6O_{11}$ amount. Subsequently, a Ceria-zirconia-praseodymium composite oxide in which the content ratio of cerium, zirconium, and praseodymium ([cerium]:[zirconium]:[praseodymium]) was 36:54:10 by mole ratio was obtained in the same manner as in Example 1. The obtained Ceria-zirconia-praseodymium composite oxide was subjected to an examination by XRD and a test for determining oxygen absorption/release amount, in the same manners as in Example 1. The obtained results are shown in the table of FIG. 1

It is clear from a comparison between the results of Examples 1 to 7 and the results of Comparative Examples 2 to 5, which were shown in the table of FIG. 1, that the ceria-zirconia-based composite oxides wherein the content of at least one element selected from the group consisting of praseodymium, lanthanum, and yttrium and the ratio of the content of both cerium and the at least one member selected from the group consisting of praseodymium, lanthanum, and yttrium to the content of zirconium were within the ranges according to an example of the invention showed remarkably improved oxygen absorption/release amounts (OSC) at 400° C. after the high-temperature durability test. Consequently, it was ascertained that the oxygen storage material was sufficiently inhibited from thermally deteriorating and these composite oxides sufficiently exhibited the oxygen absorption/release function from a temperature as low as about 400° C. Furthermore, it was ascertained that the κ-phase retention rate after the high-temperature durability test approximately corresponded to the OSC performance and that the higher the κ-phase retention rate, the more the OSC performance tends to increase.

Additionally, the sample containing iron added thereto (Comparative Example 1) was inferior in both I(14/29) and OSC to the sample containing no iron (Comparative Example 4). It was thus ascertained that iron was not appropriate as an additive element.

As described above, according to the example of the invention, it is possible to provide: a ceria-zirconia-based composite oxide in which the oxygen storage material can be sufficiently inhibited from deteriorating thermally and which can sufficiently exhibit the oxygen absorption/release function from a temperature as low as about 400° C.; a method for producing the composite oxide; and a catalyst for exhaust gas purification which includes the ceria-zirconia-based composite oxide.

Since the ceria-zirconia-based composite oxide according to examples of the invention can exhibit the oxygen absorption/release function from a lower temperature as described above, this composite oxide is suitable for use as the support, promoter, or the like of a catalyst for exhaust gas purification which is used under conditions including temperatures as relatively low as about 400° C. or below. Furthermore, the catalyst for exhaust gas purification according to examples of the invention, which includes the ceria-zirconia-based composite oxide according to an example of the invention, further has improved heat resistance and hence is especially suitable as a catalyst for use under such relatively low-temperature conditions.

The invention claimed is:

1. A ceria-zirconia-based composite oxide comprising:
a composite oxide containing ceria and zirconia, wherein the ceria-zirconia-based composite oxide contains at least one member selected from the group consisting of praseodymium, lanthanum, and yttrium in an amount of 0.5 to 5.0 mol % relative to a total amount of cations contained in the ceria-zirconia-based composite oxide,
where a ratio of a content of both cerium and the at least one member selected from the group consisting of praseodymium, lanthanum, and yttrium to a content of zirconium in the ceria-zirconia-based composite oxide therein ([cerium and the at least one member selected from the group consisting of praseodymium, lanthanum, and yttrium]:[zirconium]) is in a range of 43:57 to 48:52 by mole ratio, and
when heated for 5 hours in the atmosphere under a temperature condition of 1,100° C. and thereafter examined by X-ray diffractometry using CuKα, the ceria-zirconia-based composite oxide exhibits an X-ray diffraction pattern in which an intensity ratio of diffraction line at a 2θ of 14.5° to diffraction line at a 2θ of 29° {I(14/29) value} and an intensity ratio of diffraction line at a 2θ of 28.5° to diffraction line at a 2θ of 29° {I(28/29) value} satisfy the following conditions:
I(14/29) value≥0.02; and
I(28/29) value≤0.08.

2. A method for producing a ceria-zirconia-based composite oxide according to claim 1,
the method comprising:
preparing a ceria-zirconia-based solid-solution powder that contains at least one member selected from the group consisting of praseodymium, lanthanum, and yttrium in an amount of 0.5 to 5.0 mol % relative to a total cation amount, a ratio of a content of both cerium and the at least one member selected from the group consisting of praseodymium, lanthanum, and yttrium to a content of zirconium ([cerium and the at least one member selected from the group consisting of praseodymium, lanthanum, and yttrium]:[zirconium]) being in a range of 43:57 to 48:52 by mole ratio;
press-molding the ceria-zirconia-based solid-solution powder at a pressure of 400 to 3,500 kgf/cm$^2$; and
subjecting, after the press molding, the ceria-zirconia-based solid-solution powder to a reduction treatment under temperature conditions of 1,450 to 2,000° C. to obtain the ceria-zirconia-based composite oxide, wherein the ceria-zirconia-based composite oxide, when heated for 5 hours in the atmosphere under a temperature condition of 1,100° C. and thereafter examined by X-ray diffractometry using CuKα, exhibits an X-ray diffraction pattern in which an intensity ratio of diffraction line at a 2θ of 14.5° to diffraction line at a 2θ of 29° {I(14/29) value} and an intensity ratio of diffraction line at a 2θ of 28.5° to diffraction line at a 2θ of 29° {I(28/29) value} satisfy the following conditions:
I(14/29) value≥0.02; and
I(28/29) value≤0.08.

3. The method for producing a ceria-zirconia-based composite oxide according to claim 2, further comprising subjecting, after the reduction treatment, the ceria-zirconia-based composite oxide to an oxidation treatment.

4. A catalyst for exhaust gas purification, comprising a ceria-zirconia-based composite oxide produced according to the method of claim 2.

5. A catalyst for exhaust gas purification, comprising the ceria-zirconia-based composite oxide according to claim 1.

* * * * *